United States Patent
Evans et al.

[11] 3,824,865
[45] July 23, 1974

[54] PROJECTILE HAVING A GYROSCOPE

[75] Inventors: John L. Evans, Oakland; C. John DeCotiis, Cranford; Victor P. Johnson, Fair Lawn, all of N.J.

[73] Assignee: The Singer Company, Little Falls, N.J.

[22] Filed: Sept. 21, 1972

[21] Appl. No.: 290,856

[52] U.S. Cl. .................................. 74/5.6 D, 74/5.7
[58] Field of Search........... G01c/19/28; 74/5.6, 5.7, 74/5.1, 5.12; 308/5, 9, DIG. 1

[56] References Cited
UNITED STATES PATENTS

| | | | |
|---|---|---|---|
| 3,045,197 | 7/1962 | Vanslette | 74/5.6 X |
| 3,105,657 | 10/1963 | Mueller et al. | 74/5.7 |
| 3,233,467 | 2/1966 | Brannon | 74/5.7 |
| 3,257,854 | 6/1966 | Schneider et al. | 74/5.7 |
| 3,457,793 | 7/1969 | Evans | 74/5.1 |
| 3,604,277 | 9/1971 | Stripling et al. | 74/5.7 |
| 3,677,098 | 7/1972 | Davis | 74/5.12 |
| 3,718,379 | 2/1973 | Williams et al. | 308/9 |

*Primary Examiner*—Manuel A. Antonakas
*Attorney, Agent, or Firm*—T. W. Kennedy

[57] ABSTRACT

A projectile including, a housing, an optical tracker, and a gyroscope disposed within the housing, the housing having a nose section and a base section forming a chamber enclosing the tracker and the gyroscope, the nose section having a window, the optical tracker having an optical lens unit and an image detector unit mounted on the gyroscope, the optical unit being arranged to receive an image through the window and to transmit the image to the image detector unit, the gyroscope comprising, a stator mounted on the base section within the chamber, the stator having a stator axis, a hollow rotor mounted on the stator, the rotor having a rotor axis intersecting the stator axis at a pivot point, anti-friction means disposed between the stator and the rotor, drive means adapted to rotate the rotor relative to the stator about the rotor axis, wherein the stator has a peripheral wall enclosing a recess, the recess being arranged to receive the image detector unit, the stator peripheral wall having a spherical outer surface, the spherical outer surface having a spherical center substantially coinciding with the pivot point.

7 Claims, 10 Drawing Figures

3,824,865

PROJECTILE HAVING A GYROSCOPE

The present invention relates to a guided projectile having a gyroscope with an optical tracker, and particularly to a guided projectile having a fluidic type of gyroscope with an optical tracker.

A conventional guided projectile includes a housing, a gyroscope sub-assembly, and an optical tracker sub-assembly. The gyroscope sub-assembly includes a rotor, a stator having a drive shaft supporting the rotor, and a gimbal system supporting the stator. The gimbal system includes an inner gimbal supporting the stator, an outer gimbal having a pair of pivots supporting the inner gimbal, and a housing member having a pair of pivots supporting the outer gimbal. A conventional guided projectile is described in U.S. Pat. No. 2,963,973, issued Dec. 30, 1960.

One problem with the conventional guided projectile is the excessive stresses caused in the gimbal system due to an axial acceleration force, which exists during the vehicle takeoff condition.

In accordance with one embodiment of the present invention, the problem of excessive stresses caused in the gimbal system due to an axial acceleration force during the vehicle take off condition is avoided by eliminating the gimbal system, and by using a hollow spherically shaped rotor, a spherically shaped stator, a gas bearing which is disposed between the rotor and stator and a gas drive means for driving the rotor. During vehicle takeoff, the spherical inner bearing surface of the rotor bears against the spherical outer surface of the stator whereby stresses due to the axial acceleration force are minimized.

Accordingly, one object of the present invention is to provide a guided projectile which has a fluidic gyroscope having an optical tracker.

Another aspect of the invention is to provide a guided projectile which has a fluidic gyroscope having an optical tracker wherein stresses, which are caused by the axial acceleration force that occurs during vehicle takeoff, are minimized.

It is a further object to provide a guided projectile which has a fluidic gyroscope according to the aforementioned objects which has a wide-angle pickoff device and a wide-angle torquer device.

According to the present invention a projectile is provided comprising, a projectile including, a housing, an optical tracker, and a gyroscope disposed within said housing, said housing having a nose section and a base section forming a chamber enclosing said tracker and said gyroscope, said nose section having a window, said optical tracker having an optical lens unit and an image detector unit mounted on said gyroscope, said optical unit being arranged to receive an image through said window and to transmit the image to said image detector unit, said gyroscope comprising, a stator mounted on said base section within said chamber, said stator having a stator axis, a hollow rotor mounted on said stator, said rotor having a rotor axis intersecting said stator axis at a pivot point, anti-friction means disposed between said stator and said rotor, drive means adapted to rotate said rotor relative to said stator about said rotor axis, wherein said stator has a peripheral wall enclosing a recess, said recess being arranged to receive said image detector unit, said stator peripheral wall having a spherical outer surface, said spherical outer surface having a spherical center substantially coinciding with said pivot point.

Further objects of the invention will become apparent, in the following description of a specific embodiment of the invention, wherein like parts are designated by like numerals throughout the several views, and wherein.

Figures 1, 9, 10:
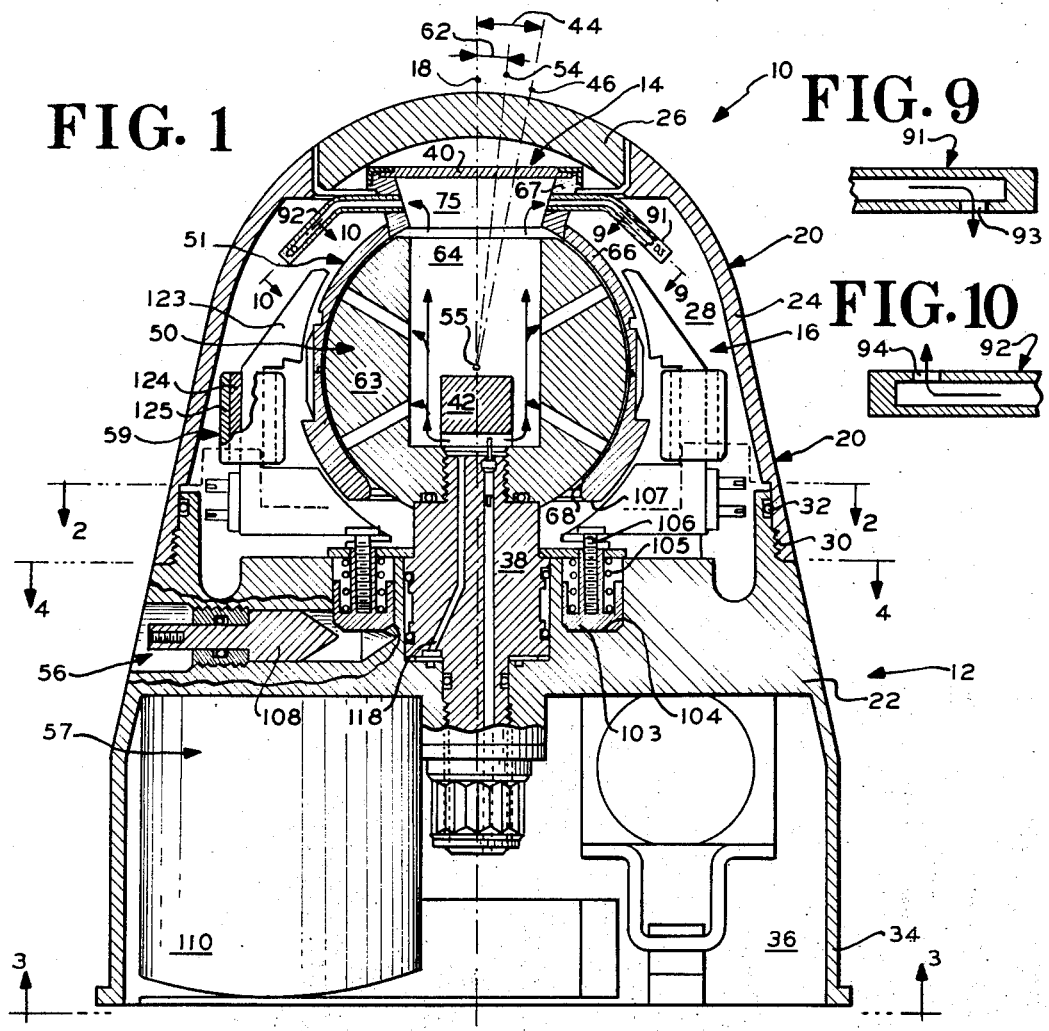
FIG. 1 is a sectional view of one embodiment of a guided projectile in accordance with the present invention.
FIG. 9 is a sectional view as taken along the line 9—9 of FIG. 1.
FIG. 10 is a sectional view as taken along the line 10—10 of FIG. 1.

Referring to FIG. 1, one embodiment of the present invention is a guided projectile 10. Guided projectile 10 includes a housing 12, an optical tracker 14, and a gyroscope 16. Housing 12 has a longitudinal axis 18.

Housing 12 includes a nose section 20, and a base section 22, which are coaxial along housing axis 18. Nose section 20 includes a tapered peripheral wall 24 which has a forward window 26. Nose section 20 and base section 22 enclose a sealed chamber 28. Tapered wall 24 has a threaded connection 30, which connects to base section 22, and has an annular seal ring 32, which seals chamber 28.

Base section 22 has a flange 34, which encloses portions of gyroscope 16, as explained hereafter. Flange 34 is adapted to be connected to another projectile portion (not shown). Flange 34 encloses space 36. Chamber 28 contains a gas, which is maintained at a selective pressure, such as sea level pressure, as explained hereafter. Base 22 has a pedestal member 38, which supports a part of gyro 16, as explained hereafter.

Optical system 14, which is similar in part to the optical system described in the aforementioned U.S. Pat. No. 2,963,973, includes optical lens unit 40 and an image detector means 42, which preferably is a photoconductor. Image detector 42 senses the magnitude of the angle 44 between the line-of-sight axis 46 and the housing axis 18, and also measures the differential, or change with respect to time, of the magnitude of the angle 44.

Figure 2:
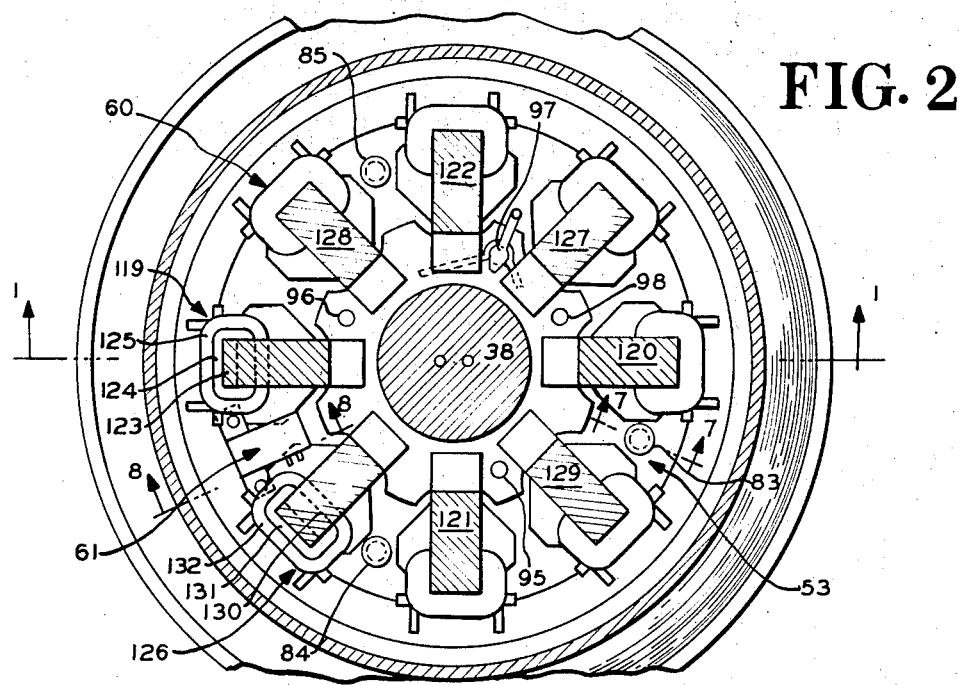
FIG. 2 is a sectional view as taken along the line 2—2 of FIG. 1.
Figure 7:
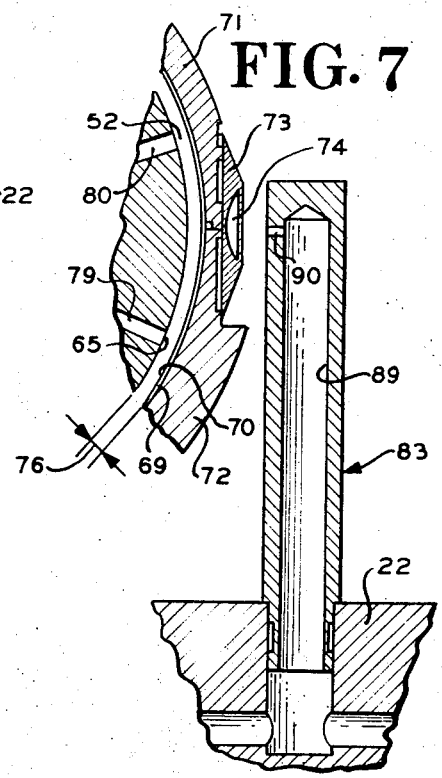
FIG. 7 is a sectional view as taken along the line 7—7 of FIG. 2.

According to the invention, gyroscope 16 (FIG. 1) includes a stator 50, which is disposed in chamber 28 and which is coaxial with housing 12 along axis 18, a hollow rotor 51, which is mounted on stator 50 for rotation relative thereto, anti-friction gas bearing means 52 (FIG. 7) which is disposed between rotor 51 and stator 50, and a gas drive means 53 (FIG. 2) which rotates rotor 51 relative to stator 50. Rotor 51 has a rotor axis 54, which intersects stator axis 18 at a pivot point 55.

Figure 8:
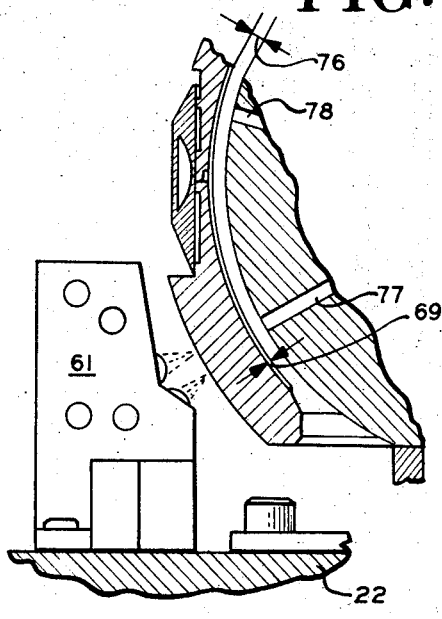
FIG. 8 is a sectional view as taken along the line 8—8 of FIG. 2.

Gyroscope 16 also includes a gas caging means 56, which engages rotor 51, and a gas supply means 57, which is connected to caging means 56, and to gas bearing means 52. Gyro 16 also has a gas pressure control means 58 (FIG. 8), as explained hereafter.

Gyroscope 16 also includes pickoff means 59, which senses the angle and direction of tilt of rotor axis 54 relative to housing axis 18, and includes torquer means 60, which is adapted to selectively apply a torque to rotor 51. Gyroscope 16 (FIG. 8) also includes a rotor speed indicator 61, which has a conventional type of construction.

Pickoff means 59 senses the magnitude of the angle 62 between the rotor axis 54 and the stator axis 18, and also measures the differential, or change with respect to time, of the magnitude of angle 62.

Stator 50, (FIG. 1), which is symmetrically disposed about stator axis 18, includes a peripheral wall 63, which encloses a recess 64 that receives image detector unit 42. Peripheral wall 63 has a spherical outer surface 65 (FIG. 7), which has a spherical center (not shown), which is substantially coincident with pivot point 55. Stator 50 is mounted on the pedestal member 38, which is fixedly connected to base 22. Image detector unit 42 is located adjacent to pivot point 55 whereby the need for complex gyroscope gimbals and the need for additional optical lenses can be avoided.

Rotor 51 (FIG. 1), which can rotate about rotor axis 54 and which can tilt about pivot point 55, includes a peripheral wall 66, and an end wall 67, which together enclose a cavity 68 that receives stator 50.

Peripheral wall 66 (FIG. 7) has a liner 69, (FIG. 7) which has an inner surface 70 of spherical shape that has a spherical center (not shown) that is substantially coincident with pivot point 55 during the rotor spinning condition.

Peripheral wall 66 includes an upper section 71, a lower section 72, and a ring-shaped flywheel 73, which has a plurality of bucket portions 74 on the exterior side thereof. End wall 67, which supports optical lens unit 40, enclosed a plenum space 75 that connects to gas bearing means 52. End wall 67 supports a part of drive means 53, as explained hereafter, which transmits gas from cavity 68 to chamber 28.

Liner 69 which is preferably a cast film, is composed of a material such as a plastic, which has a substantially lower modulus of elasticity than the material of the rotor 51 and stator 50 which is preferably a metal material. In this way, stresses in rotor 51 and stator 50 caused by an acceleration force directed along stator axis 18 from rotor 51 to stator 50 are minimized.

Anti-friction means (FIGS. 1, 7 and 8), which is a pressurized gas bearing means, includes the arrangement of liner inner surface 70 and stator outer surface 65 which form gas bearing gap 76 therebetween, and includes a plurality of gas conduits 77, 78, 79, 80 (FIGS. 7, 8), which extend through stator 50, and which connect to gap 76.

Drive means 53 includes a spin-up drive unit 81 and a sustainer drive unit 82. Spin-up drive 81 (FIGS. 2, 4, 7) includes a plurality of jet members 83, 84, 85, (FIG. 2), which connect to respective spin-up gas passages 86, 87, 88, (FIG. 4), that extend through base 22. Each spin-up jet member 83 (FIG. 7) has an interior passage 89, which has an outlet orifice 90 that faces rotor buckets 74. Spin-up drive 81 is adapted to accelerate the spinning of rotor 51 from zero spin velocity to a selective spin velocity, after uncaging of rotor 51.

Sustainer drive unit 82 includes a plurality of sustainer tubes 91, 92, which have respective outlet ports 93, 94. Tubes 91, 92 are mounted on rotor 51 and connect to cavity 68. Sustainer drive unit 82 is adapted to spin rotor 51 at its selective spin velocity, after spin-up of rotor 51.

Figure 4:
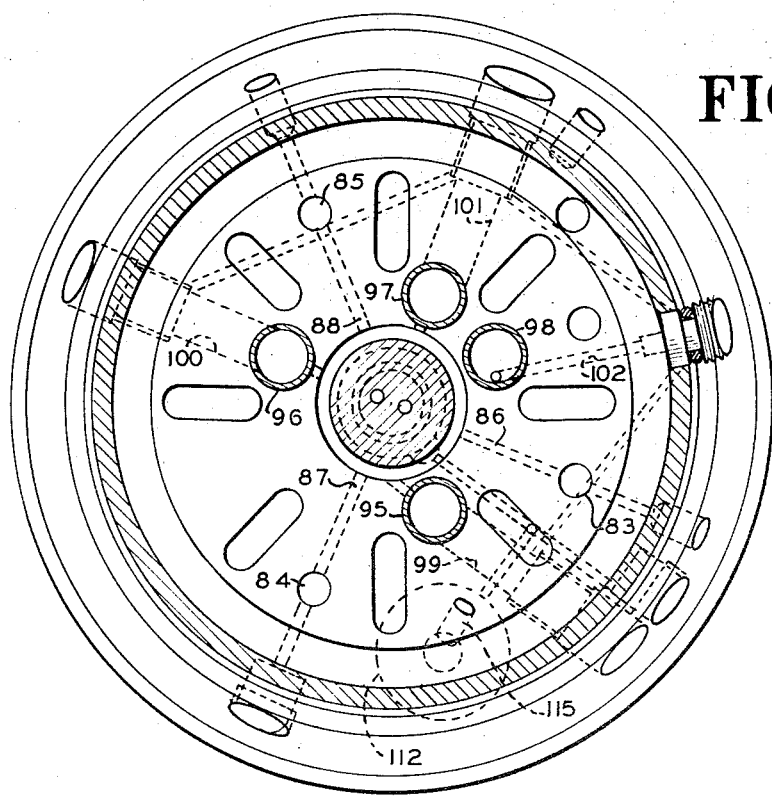
FIG. 4 is a sectional view as taken along the line 4—4 of FIG. 1.

Caging means 56 (FIGS. 1, 2 and 4) includes a plurality of caging units 95, 96, 97, 98, which connect to respective uncaging gas passages 99, 100, 101, 102 (FIG. 4). Caging unit 95, which is identical in construction to caging units 96, 97, 98, includes a plunger 103, which is received in a cylindrical cavity 104 in base 22, a coil spring 105, which urges plunger 103 away from rotor 51, and an adjustable bearing bolt 106. Bolt 106 is urged in bearing against an underside bearing surface 107 on rotor 51 by locking pin 108, prior to the spin-up condition in order to lock rotor 51 during the take-off of projectile 10. After projectile 10 completes its take-off, supply means 57 raises the gas pressure in uncaging passage 99 and displaces pin 108 so as to uncage plunger 103. Then, spring 105 urges plunger 103 away from rotor bearing surface 107 thereby uncaging rotor 51 prior to the rotor spin-up.

Figure 3:
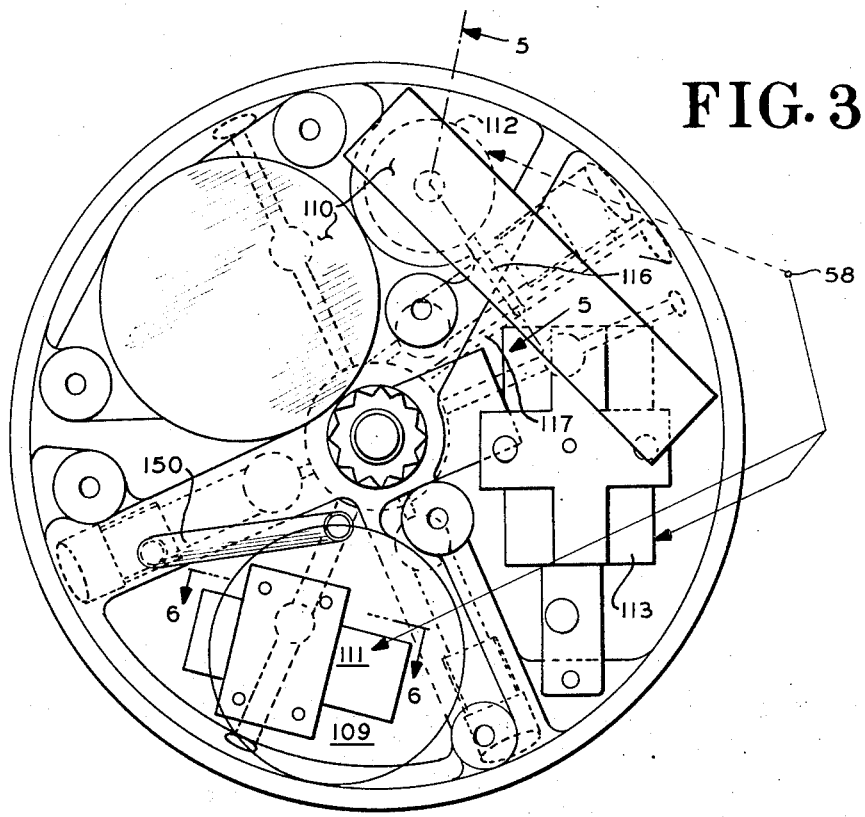
FIG. 3 is a sectional view as taken along the line 3—3 of FIG. 1.
Figure 6:
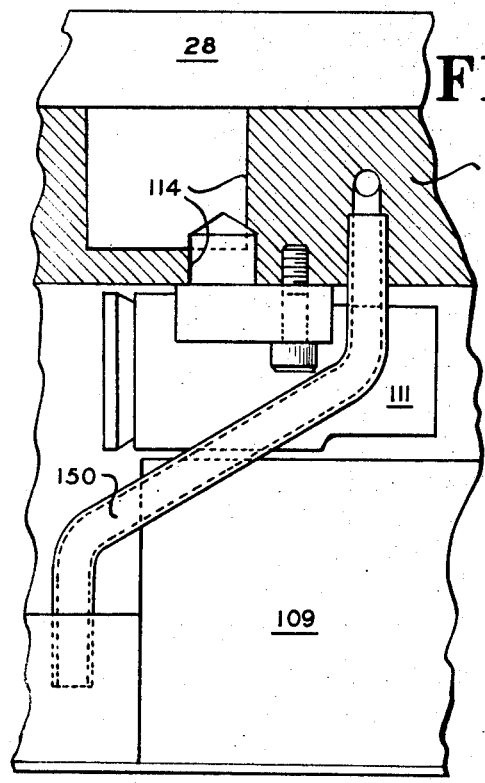
FIG. 6 is a sectional view as taken along the line 6—6 of FIG. 3.

Supply means 57 (FIG. 3) includes a spin-up supply bottle 109 and outlet tube 150 (FIG. 6) which connects to spin-up gas passages 86, 87, 88, and which connects to uncaging gas passages 99, 100, 101, 102, and a main supply bottle 110, which connects to stator recess 64 for supplying gas bearing gap 76 and sustainer tubes 91, 92 as explained hereafter.

Gas pressure control means 58, (FIG. 3) includes a pressure relief valve 111, which is disposed next to spin-up bottle 109, a bearing gas pressure regulator 112, which is disposed adjacent to main bottle 110, and a compartment gas pressure regulator 113, which is disposed between pressure regulator 112 and spin-up bottle 109.

Relief valve 111 (FIG. 6) has a valve passage 114, which extends through base 22. Valve 111 releases the relatively small volume of spin-up gas, which enters chamber 28 at a very high rate during spin-up. In this way, the gas oversupply during spin-up is released from chamber 28 by valve 111.

Figure 5:
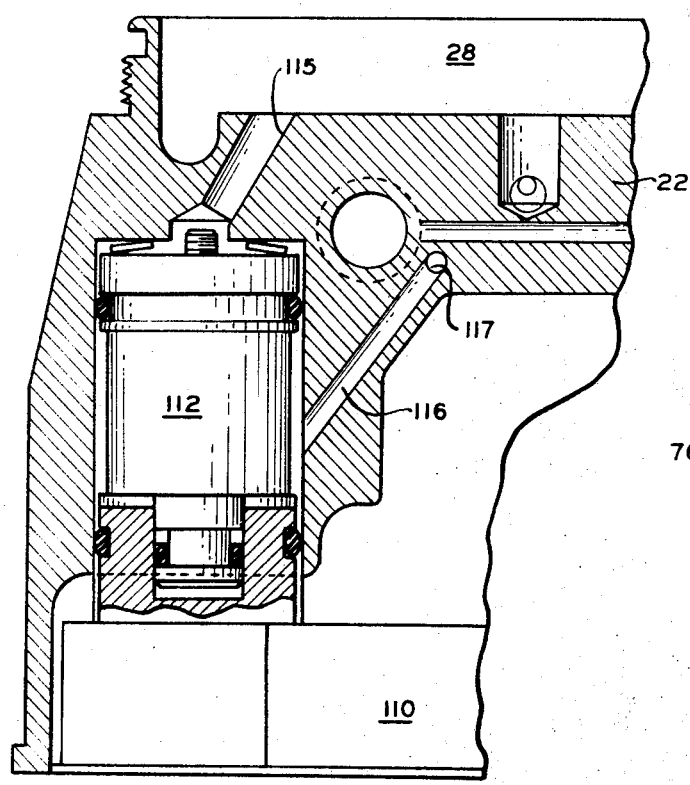
FIG. 5 is a sectional view as taken along the line 5—5 of FIG. 3.

Bearing gas pressure regulator 112 (FIG. 5) has its reference sensing port 115 connected to chamber 28. Regulator 112 has interconnected passage portions 116, 117, 118 (FIGS. 1, 4, 5) interconnecting stator recess 64 to main bottle 110. Regulator 112 maintains the gas pressure in gas bearing gap 76 and in sustainer tubes 91, 92 at a selective pressure, which remains substantially fixed regardless of variations in ambient air pressure.

Compartment gas pressure regulator 113 (FIG. 1, 3) maintains the gas pressure in chamber 28 at a fixed pressure, such as sea level pressure, in order to minimize fluctuations in sustainer momentum and rotor speed.

Pickoff means 59 includes a first pair of pickoff units 119, 120, which are aligned, and a second pair of pickoff units 121, 122, which are also aligned and which are disposed at right angles to units 119, 120. Pickoff unit 119, which is identical in construction to pickoff units 120, 121, 122, includes a u-shaped core 123, a primary excitation winding 124, and a secondary output winding 125. Pickoff unit 119 is a variable reluctance type of pickoff unit, and is a wide-angle type of pickoff, as shown in FIG. 1.

An AC voltage is applied to primary winding 124, and a resultant, output voltage is generated in secondary winding 125. The opposite secondary windings 125 of units 119, 120 are connected in a bucking arrangement, so that a null condition occurs when the reluctance of both units 119, 120 are equal. When rotor 51 has an angular displacement about pivot point 55 relative to stator 50, the output voltage from each pair of pickoff units 119, 120 and 121, 122 measures the magnitude and the direction of the tilt angle 62 between rotor axis 54 and stator axis 18.

Torquer means 60 includes a first pair of torquer units 126, 127, which are aligned, and a second pair of torquer units 128, 129, which are also aligned and which are disposed at right angles to torquer units 126, 127. Torquer unit 126 is typically separated from its adjacent pickoff unit 119 by an angle of 45°. Torquer unit 126, which is identical in construction to torquer units 127, 128, 129, includes a U-shaped core 130, a primary winding 131, and a secondary winding 132.

Torquing is achieved through use of two pairs of variable reluctance torquers 126, 127 and 128, 129, which are case fixed, and a highly permeable return path formed by the rotor 51, that is separated from the torquer poles by an air gap.

Each "U" shaped, soft magnetic iron core 130 has two pole faces which are spherically formed to conform to the shape of rotor 51. Coils 131 and 132 are wound around the base of the core 130. The core 130 is positioned over rotor 51 so that at gyro null, one half of each stator pole face is covering one half of each rotor pole, as shown in FIG. 1. The variable reluctance path areas are determined by the locations of the return path steps machined as an integral part of the rotor 51. The lower section 72 of rotor 51 has an increased radius of curvature to accomplish the necessary axial mass balance to the rotor, so that the center of gravity of rotor 51 substantially coincides with pivot point 55.

Applying current to primary coil 131 of one torquer unit 126 produces a torque in the direction to make the rotor poles line up with the stator poles. By applying the same current to a coil of the opposite torquer unit 127, which is located at an angle of 180° away, the torque of the second torquer unit 127 will be equal and opposite to that of the first torquer unit 126. This is the normal operating condition of the torquer pair of zero net torque. The secondary or control coil 132 of opposite torquer units 126, 127 are connected in series so that flux is added to one unit 126 and is subtracted from the opposite unit 127. Thus, the resulting torque on rotor 51 is the difference in torque produced by both torquer units 126, 127. Such an arrangement provides a linear type of torquer because the output thereof is proportional to the value of the applied control current.

In operation, there is a number of operational phases, as indicated hereafter.

1. Projectile 10 is launched by a launching device, such as a cannon. During take-off, rotor 51 is locked in place by caging pads or bolts 116, which are locked in place by locking pins 108.

2. After projectile 10 passes its apogee in flight, spin-up supply bottle 109 (FIG. 3) is actuated. Its gas, such as nitrogen gas, is released under pressure from bottle 109 through spin-up gas passages 86, 87, 88 and through uncaging gas passages 99, 100, 101, 102 thereby unlocking caging bolts 106 and driving rotor 51. The gas passes through spin-up jet member passages 89 and through outlet orifices 90, and impinges upon rotor flywheel buckets 74 thereby spinning-up rotor 51 from zero velocity to a selective design velocity. Relief valve 111 releases the gas oversupply in chamber 28.

3. During spin-up, main supply bottle 110 (FIG. 3) is actuated thereby releasing gas to gas bearing gap 76. Gas from main bottle 110, which is regulated by bearing gas regulator 112, passes through passage portions 116, 117, 118 (FIGS. 1, 4, 5), then through stator recess 64, then through bearing gap 76 and through sustainer tubes 91, 92 to chamber 28, thereby spinning rotor 51 at its fixed design rotor speed.

4. Pickoff means 59 senses the amount and direction of tilt angle 62 between rotor axis 54 and stator axis 18. Torquer means 60, at this phase, receives a signal from pickoff means 59 and urges rotor 51 to align rotor axis 54 with stator axis 18.

5. After passing through its apogee in flight, and after rotor 51 reaches its fixed design speed, image detector 42 senses a predetermined type of target point, such as a source of radiation, such as target point caused by a laser unit. Image detector 42 senses angle 44 between line-of-sight axis 46 and stator axis 18. Torquer means 60 is then actuated to torque rotor 51 so that rotor axis 54 aligns with line-of-sight axis 46.

6. Torquer means 60 then senses any change in angle between rotor axis 54 and line-of-sight axis 46. The signal from torquer means 60 is used by a control means (not shown), which controls the direction of flight of projectile 10 toward the target point. If the target point moves in an unknown path, the vehicle 10 is directed toward the moving target point.

In summary, there are a number of advantages to the present invention, as indicated hereafter. The film cast bearing liner 69 provides a means of distributing the inertial stresses resulting from the high acceleration, launch shock, and at the same time renders the manufacture of this critical component economically feasible for high volume production. The variable reluctance pickoffs 119, 120, 121, 122 and torquers 126, 127, 128, 129 function on an area-variation design, which provides a means of achieving large angular freedom, such as up to ± 20° angular freedom. The rotor 51 and stator 50 are configured so as to provide a large recess 64 at the geometric bearing center 55 for a detector 42, and this arrangement greatly simplifies the overall guidance mechanization problem. The absolute pressurization system, which includes valve 111 and regulators 112, 113 prevents ingestion of contaminates and provides a constant back pressure to the gyroscope 16, particularly to the speed sustainers 91, 92.

While the present invention has been described in a preferred embodiment, it will be obvious to those skilled in the art that various modifications can be made therein within the scope of the invention. It is intended that the following claims cover all such modifications.

What is claimed is:

1. A gyroscope comprising:
   a. a base;
   b. a stator mounted on said base and having an axis of symmetry;

c. a hollow rotor mounted on said stator for rotation relative to said stator about a spin axis, said rotor spin axis innersecting said stator axis of symmetry at a pivot point;
d. said stator having an outer surface of spherical shape having a center of sphericity disposed substantially coincident with said pivot point;
e. anti-friction means disposed between said stator outer surface and said rotor inner surface to permit relative angular movement between said rotor and said stator, said rotor having an outer surface of spherical shape which is formed of a magnetic permeable material, said rotor outer surface having a center of sphericity disposed substantially coincident with said pivot point;
f. wide-angle variable reluctance pick-off means for sensing the angle and direction of tilt of said rotor spin axis relative to said stator axis of symmetry;
g. said pick-off means including at least one pick-off unit with a magnetic core having upper and lower surfaces respectfully facing said rotor outer surface and being separated therefrom by respective gaps of uniform thickness; and
h. said rotor outer surface being formed to constitute a highly permeable variable reluctance return path for said pick-off unit core and enabling said pick-off unit to sense over a relatively large tilt angle of said spin axis of said rotor relative to said stator axis of symmetry.

2. The gyroscope as claimed in claim 1 including torquer means for applying a torque on said rotor to control the tilt of said rotor spin axis relative to the axis of symmetry of said stator,
said torquer means including at least one torquer unit with a magnetic core having upper and lower inner surfaces respectively facing said rotor outer surface and being separated therefrom by respective gaps of uniform thickness for torquing over a relatively large tilt angle of said spin axis relative to said stator axis of symmetry.

3. The gyroscope as claimed in claim 2, wherein said pickoff means includes four such pickoff units equiangularly spaced about the spin axis of said rotor,
each pickoff unit including a U-shaped core of magnetic iron and a pair of coils wound on said core.

4. The gyroscope as claimed in claim 3, wherein said torquer means includes four such torquer units equiangularly spaced about the spin axis of said rotor,
each torquer unit including a U-shaped core of magnetic iron and a pair of coils wound on said core, said four torquer units being alternately spaced between said four pickoff units,
said adjacent units being spaced apart at an angle of about 45°.

5. The gyroscope as claimed in claim 1, wherein said rotor has a liner fixedly joined to said rotor inner surface,
said linear having an inner surface of spherical shape facing said stator outer surface,
said liner being composed of a material having a substantially lower modulus of elasticity than the material of said rotor and the material of said stator, for minimizing contact pressure between said stator outer surface and said rotor inner surface during transfer of acceleration load therebetween.

6. The gyroscope as claimed in claim 1, and which includes a ring-shaped flywheel concentrically mounted on said rotor.

7. The gyroscope as claimed in claim 2, wherein said flywheel has a plurality of drive buckets formed on the exterior side thereof.

* * * * *